United States Patent [19]

Nielsen

[11] 4,115,072
[45] Sep. 19, 1978

[54] RETRACTABLE FLUIDS SPRAYING ASSEMBLY

[75] Inventor: William C. Nielsen, Aiea, Hi.

[73] Assignee: Chevron Research Company, San Francisco, Calif.

[21] Appl. No.: 785,721

[22] Filed: Apr. 7, 1977

[51] Int. Cl.² .......................... B01J 3/02; B01L 1/00; B05B 1/00
[52] U.S. Cl. ................................. 422/207; 208/48 Q; 261/115; 431/189; 239/600; 422/139; 422/144
[58] Field of Search .............. 23/288 R, 289, 288 B, 23/277 R, 291; 208/48 Q; 431/186, 189; 239/390, 600; 261/115

[56] References Cited

U.S. PATENT DOCUMENTS

| 3,174,924 | 3/1965 | Clark et al. | 208/48 Q |
| 3,339,614 | 9/1967 | Fleck | 431/186 |
| 3,547,805 | 12/1970 | Mitchell | 208/48 Q |
| 3,593,968 | 7/1971 | Geddes et al. | 208/48 Q X |
| 3,663,645 | 5/1972 | Dorn | 208/48 Q X |
| 3,784,107 | 1/1974 | Rossi | 239/600 X |

Primary Examiner—Morris O. Wolk
Assistant Examiner—Michael S. Marcus
Attorney, Agent, or Firm—D. A. Newell; R. H. Davies; M. K. Bosworth

[57] ABSTRACT

A fluids spraying assembly for use with pressure vessels, the assembly being adapted to permit the spraying head to be retracted for inspection and replaced in spraying use without leakages of gases from the pressure vessel.

3 Claims, 4 Drawing Figures

RETRACTABLE FLUIDS SPRAYING ASSEMBLY

BACKGROUND OF THE INVENTION

The present invention relates to fluids spraying assemblies used with pressure vessels.

Water spraying assemblies are used to cool gases in the dilute phase in fluid catalytic cracking (FCC) catalyst regenerator vessels. They are also used in various other processing systems. Spraying heads, or nozzles, used in spraying assemblies in FCC catalyst regenerators are subjected to an extremely harsh environment, with high temperatures and abrasion by particulate solids. The spraying heads may thus become damaged or may become detached from their water supply conduits, allowing a water stream to impinge directly on hot metal surfaces in a catalyst regenerator. In order to avoid nozzle failure of this type, it is necessary to inspect the nozzles relatively frequently. Inspection of spray nozzles must be carried out during normal operation of an FCC catalyst regenerator, while the regenerator is being used for processing hot, particulate-containing gases at a pressure of 15-25 psig. It would, of course, be impractical to shut down an FCC catalyst regenerator simply in order to inspect one or more of the water spray nozzles used in the vessel, because of the serious adverse ecomonic consequences of a shutdown.

The spray nozzles utilized in FCC regenerators are attached to one end of a straight, rigid water supply conduit, or lance, inserted into an opening into the wall of the regenerator. The water supply conduit extends outwardly through a passage typically formed by a housing attached to the wall of the regenerator, and a gate valve. The gate valve is positioned to permit closing off the passage after the nozzle and water supply conduit have been retracted past the gate. Thus, escape of hot gas from the FCC regenerator can be prevented, once the spray nozzle has been retracted to a position outside the gate of the gate valve. However, the gate valve cannot be closed until the conduit and spray nozzle have been retracted.

Previously, in order to permit retraction of a spray nozzle and water supply conduit, while simultaneously preventing leakage of gas from the generator during nozzle retraction, a packing gland has been employed. The packing gland surrounded the water supply conduit, and closed off the exterior opening of the passage. A packing gland does allow the nozzle and conduit to be retracted, but the substantial friction involved in moving the supply conduit through the packing gland has made it very difficult and time-consuming to retract or insert the water supply conduit. In order to move the conduit to retract the spray nozzle to a position outside the gate of the gate valve, it has been necessary for several persons to carry out the retraction procedure, and nozzle inspection has taken an inordinately long period of time to accomplish. The present invention permits the nozzle and water supply conduit to be easily and quickly retracted for inspection without leakage of hot regeneration gases from an FCC catalyst regenerator. Further, the present invention allows the conduit and spray nozzle to be quickly and easily replaced in position for spraying use in the FCC regenerator vessel without leakage of hot gases.

SUMMARY OF THE INVENTION

In accordance with the present invention there is provided an assembly for spraying a fluid into the interior of a walled vessel containing gases at superatmospheric pressure, which comprises in combination: a retractable rigid, substantially straight conduit with a spraying head at one end thereof; means defining a passage through a wall of the vessel said passage having a first opening at an inner end which is connected to and communicates with the interior of the vessel and a second opening at an outer opposite end of said passage, which communicates with the exterior of said vessel, the passage being shaped to permit insertion and retraction of the conduit and spraying head therethrough for positioning the spraying head adjacent the first opening; means rigidly defining an orifice removably positioned across the passage, the orifice sized to permit sliding the conduit therethrough with the perimeter of the orifice closely spaced around the conduit to minimize escape of gas from the vessel through the orifice; means fixed to said outer end of said passage for releasably closing off the passage between the orifice and the first opening with the spraying head positioned adjacent the orifice within the passage, for removal of the orifice to permit inspecting the spraying head with the passage closed off; and means fixed to said outer end of said passage for releasably closing off the passage exterior to the orifice with the conduit positioned extending through the orifice.

Preferably, the assembly further includes means for introducing gas into the passage between the orifice and the first opening, for minimizing flow of gas from the vessel into the passage.

Preferably, the means for releasably closing off the passage between the orifice and the first opening is a gate valve.

The apparatus of the present invention permits easy retraction and insertion of spray heads or nozzles and water supply conduits used with pressurized vessels, such as FCC catalyst regenerators, and eliminates the need for the use of a packing gland to prevent leakage of gases from pressure vessels during retraction or insertion of spray nozzles.

DESCRIPTION OF THE DRAWINGS

The attached drawings show a preferred embodiment of the present invention in which.

DETAILED DESCRIPTION OF THE INVENTION

The fluids spraying assembly of the present invention is particularly useful for spraying fluid into vessels which contain gases at moderate superatmospheric pressures, e.g., 5-50 psig. The present assembly is particularly adapted for use in spraying cooling water into the dilute-phase region of the interior of an FCC catalyst regenerator vessel. The invention can best be understood by reference to the preferred embodiment depicted in the attached drawings. It will be understood, however, that the scope of the invention is not limited to the embodiment shown, and that the invention includes the alternatives, modifications and equivalents which are within the scope of the appended claims.

Figure 1:
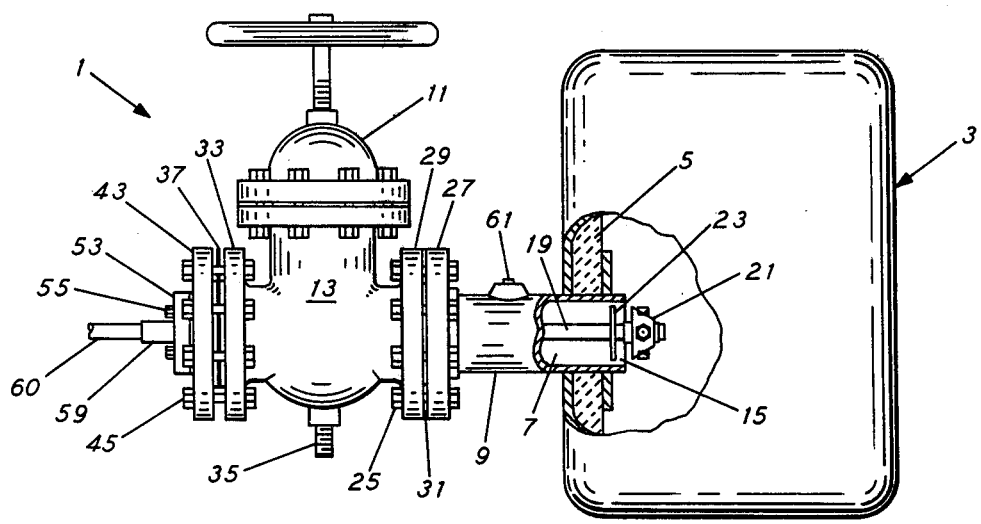
FIG. 1 shows a side perspective, partially cut-away view of an embodiment of the fluids spraying assembly.
Figure 3:
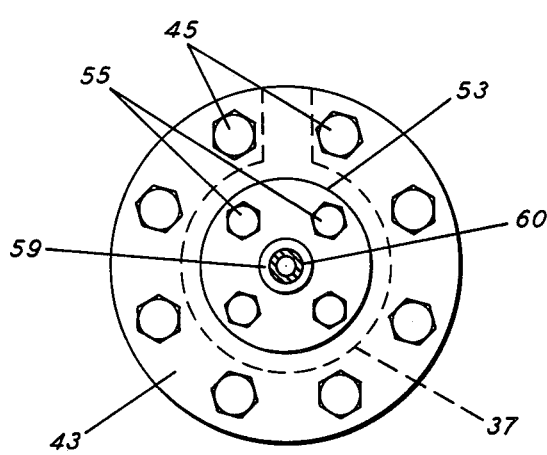
FIG. 3 shows an end view of the assembly shown in FIG. 1.

Turning first to FIG. 1, there is shown a side perspective, partially cut-away view of a fluids spraying assembly 1 which is attached to an FCC catalyst regenerator vessel 3 through a wall 5 of the vessel shown in partial cut-away in FIG. 1. The assembly 1 includes means forming a passage 7 which extends through the wall 5, the passage being formed by a circular housing section 9 extending through the wall 5 and attached thereto and a gate valve 11 with a housing 13. The passage formed by the circular housing 9 and the gate valve housing 13 opens into the interior of the vessel 3 at a first opening 15 at the inner end of the passage 7 and opens exterior to the vessel 3 at a second opening 17 at the opposite, outer end of the passage 7. Within the passage 7 is normally positioned a rigid, substantially straight water supply conduit of sufficient length to extend completely through the passage and through the openings 15 and 17, for conveying water through the passage to the vessel 3, such as a pipe or lance 19, which has an enlarged spraying head or nozzle 21 attached to its inner end. During spraying use of the assembly, the nozzle 21 is positioned at the inner opening 15 with the water supply pipe 19 extending through the passage 7 past the exterior opening 17 of the passage. A centering plate 23 is preferably fixed around the pipe 19 near the nozzle 21. The plate 23 is sized to center the pipe 19 within the passage 7.

The circular housing section 9 and the gate valve housing 13 may be fixed together by bolts 25 securing a flange 27 on the circular housing to a flange 29 on the gate valve, with a gasket 31 placed between the flanges 27 and 29 to seal their junction when the flanges 27 and 29 are bolted tightly together.

It is necessary that the supply pipe 19 and the nozzle 21 be retractable through the passage 7, so that the nozzle 21 can be inspected for wear and damage. In nozzle assemblies used previously, retraction of the pipe and nozzle has been accomplished by using a packing gland which was attached to a flange 33 at the outer end of the gate valve 11 and fit around the supply pipe to seal the outer opening 17 against the escape of gases from the passage 7.

Figure 4:
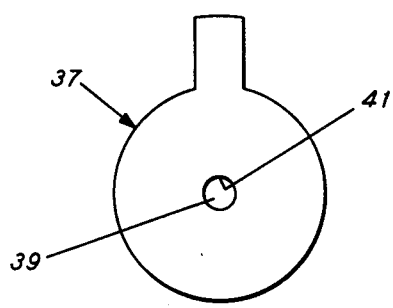
FIG. 4 shows a front view of a rigid diaphragm used in the assembly shown in FIGS. 1-3.

According to the invention, means are preferably provided for introducing gases into the passage 7 formed by the circular housing section 9 and gate valve housing 13, such as a gas inlet opening 35 into the bottom of the gate valve housing 13. The inlet 35 is connected to a source of gas, preferably compressed gas, such as air or nitrogen, and to a valve for controlling the flow of gas (not shown). By introducing pressurized gas through the inlet 35, and creating a pressure from the cold gas in the passage 7, it is possible to prevent or minimize the flow of hot gas into the passage 7 from the vessel 3 through the inner opening 15. Thus, entry of hot gas from the catalyst regenerator vessel 3 can be minimized, even when the passage 7 is not completely sealed. Further according to the invention, means are provided rigidly defining an orifice removably positioned across the passage 7 and sized to permit the pipe 19 to pass slidably through the orifice, such as a thin, corrosion-resistant, metal diaphragm 37 with an orifice 39 therein (see FIG. 4). The perimeter 41 of the orifice 39 is sized to fit closely spaced around the pipe 19 when the pipe 19 is positioned extending through the orifice 39 (see FIG. 2). The diaphragm 37 is thin enough to allow it to be deformed if necessary to retract the pipe 19 through the orifice 39. The orifice 39 is releasably positioned across the passage 7 adjacent the outer opening 17, releasably sealing the passage 7 except for the orifice 39, by a heavy plate 43, which is releasably attached to the flange 33 of gate valve 13 by bolts 45. The plate 43 has an opening 47 therein large enough to permit the pipe 19 to pass through despite scale formations thereon yet small enough to physically support the diaphragm 37 against the internal pressure of the vessel 3. Flexible gaskets 49 and 51 are positioned on either side of the diaphragm 37, so that when the plate 43 is tightly bolted to the flange 33 the opening 17 is sealed against the flow of gases except through the orifice 39. Since the orifice 39 is sized to receive the pipe 19 slidably therein, but is sufficiently small that its perimeter fits closely around the pipe 19, only a small amount of gas can escape through the orifice 39 with the pipe 19 positioned therein. This minimizes escape of pressurized gas from the passage 7 through the orifice 39. The gate valve 11 provides means for releasably sealing off the passage 7 at a cross-section between the orifice 39 and the inner opening 15, longitudinally spaced sufficiently from the diaphragm 37, when the diaphragm is positioned over the opening 17, as in FIGS. 1 and 2, to allow the operating gate of gate valve to be closed with the nozzle 21 positioned in the passage 7 between the diaphragm 37 and the gate.

Figure 2:
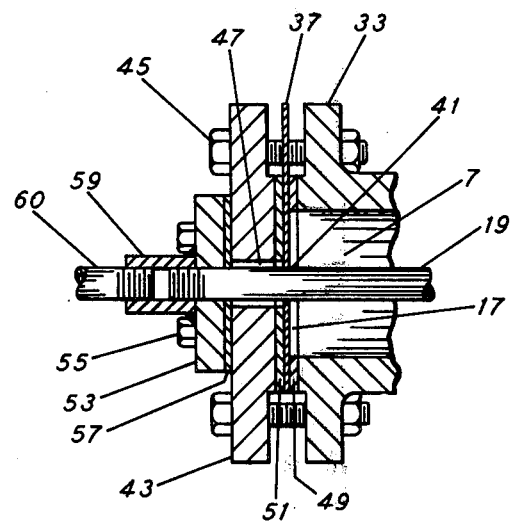
FIG. 2 shows a partial sectional view of the assembly shown in FIG. 1.

Further in accordance with the invention, means are provided for releasably closing off the passage 7 exterior to the orifice 39 with the pipe 19 positioned extending through the orifice 39, as best shown in FIGS. 1 and 2. A plate 53 extends concentrically outwardly from the outer end of the pipe 19. The plate 53 is normally bolted over the plate 43 by means of bolts 55 with a flexible gasket 57, sized to fit closely around the pipe 19, positioned between the plates 53 and 43. When the plate 53 is tightly fixed to the plate 43, the gasket 57 seals off the escape path of gas from the passage 7 through the orifice 39 and the opening 47, and the pipe 19 is fixed against longitudinal movement in the passage 7.

The pipe 19 preferably has a sleeve 59 fixed thereto to allow connection to a water supply, as by a pipe section 60. A steam inlet 61 is preferably provided and is preferably located on the circular housing section 9. The inlet 61 is connected to a source of steam (not shown) and is used for purging the passage 7 adjacent the inner opening 15 during normal spraying use of the nozzle 21. This prevents particulate solids such as FCC catalyst from passing through the inner opening 15 and clogging the passage 7.

In operation of the embodiment shown, the pipe 19 and spraying head or nozzle 21 are normally positioned as shown in FIG. 1 during spraying use, with the nozzle 19 positioned adjacent the inner opening 15 for spraying into the vessel 3. The plate 43 is bolted tightly to the flange 33, so that the outer opening 17 in the outer end of the gate valve housing 13 is sealed by the gaskets 49 and 51 except for the orifice 39, with the diaphragm 37 positioned between the gaskets 49 and 51. The plate 53 is bolted tightly to the plate 43, so that the pipe 19 is fixed against longitudinal movement through the passage 7. The opening from the passage 7 through the orifice 39 around the pipe 19 is thereby completely sealed against escape of gas from the vessel 3. The flow of gas through the gas inlet 35 is shut off during normal spraying use of the assembly.

When it is desired to retract the nozzle 21 for inspection, flow of water through the pipe 19 is shut off. The flow of gas through the inlet 35 is preferably commenced. For this purpose, it is sufficient to use ambient-temperature air, preferably at superatmospheric pressure, for introduction through the inlet 35. Other gases may also be used, such as nitrogen. The pressure of the air used is preferably at least as high as the pressure of the gas in the vessel 3, so that only a minimal amount of hot gas escapes from the vessel 3 into the passage 7 through any pressure differential. The bolts 55 are then removed, releasing the gasket 57 and thereby freeing the pipe 19 for movement longitudinally for retraction through the passage 7. Releasing the gasket 57, in addition to freeing the pipe 19, also creates an escape path for gas through the orifice 39 and the opening 47, allowing some pressurized gas to escape from the passage 7 into the exterior atmosphere. However, by adjusting flow of pressurized air into the passage 7 from the gas inlet 35, leakage of hot gases from the vessel 3 is preferably minimized, even when the passage 7 is substantially opened to the outer atmosphere through the orifice 39 and the opening 47. The perimeter 41 of the orifice 39 is sized so that only a very small amount of leakage through the orifice 39 takes place with the pipe 19 extending through the orifice 39, but the pipe 19 can still be easily moved slidably outwardly through the orifice 39 to retract the nozzle 21 through the passage 7, the thinness of the diaphragm 37 permitting such deformation as may be necessary to permit the passage of the pipe 19 despite formation of scale thereon. Once the pipe 19 has been retracted sufficiently that the nozzle 21 is positioned between the diaphragm 37 and the intermediate cross-section of the passage 7 at which the operating gate (not shown) of the gate valve 11 seals off the passage 7, the gate valve 11 is then shut to seal the passage 7. Thereafter, the flow of gas through the gas inlet 35 is preferably discontinued and the plate 43 is unbolted from the flange 33. The nozzle 21 is then accessible for inspection and replacement or repair, if needed. After inspection of the nozzle, the plate 43 is again tightly bolted to the flange 33 with the diaphragm 37 and gaskets 49 and 51 in place as shown in FIGS. 1 and 2. The flow of gas through the gas inlet 35 is then preferably restarted, and the gate valve 11 is opened. The pipe 19 and nozzle 21 are again inserted longitudinally into the passage 7 to the position shown in FIG. 1, and the plate 53 is then bolted tightly to the plate 43. This tightens the gasket 57 and again completely seals the opening around the pipe 19, cutting off the escape path for gas from the passage 7 and fixing the pipe 19 against longitudinal movement. The flow of air through the gas inlet 35 is then discontinued and normal spraying use of the assembly is again commenced.

A preferred embodiment of the fluids spray assembly of the present invention having been described, a variety of alternatives, modifications and equivalents of the depicted embodiment within the scope of the appended claims will be apparent to those skilled in the art.

What is claimed is:

1. An assembly for spraying a fluid into the interior of a walled vessel enclosing gas at superatmospheric pressure, comprising in combination:

a retractable, rigid, substantially straight conduit with a spraying head at one end thereof;

housing means connected to an opening in a wall of a vessel and defining a passage therethrough, said passage having a first opening at an inner end which is connected to and communicates with the interior of the vessel and a second opening at an outer opposite end of said passage, exterior to the vessel, said passage being shaped to permit insertion and retraction of said conduit and spraying head therethrough for positioning said spraying head adjacent said first opening;

means rigidly defining an orifice removably positioned across said passage and adjacent said second opening thereof, said orifice being sized to permit sliding said conduit therethrough with the perimeter of said orifice closely spaced around conduit to minimize escape of gas from said vessel through said orifice;

means releasably fixed to said passage for selectively closing off said passage between said orifice and said first opening with said spraying head positioned adjacent said orifice within said passage for removal of said orifice to permit inspecting said spraying head with said passage closed off; and means releasably fixed to said outer end of said passage for selectively closing off said passage to prevent the escape of gases through said passage and said orifice with said conduit positioned extending through said orifice.

2. An assembly according to claim 1 further including means for introducing gas into said passage between said orifice and said first opening, for minimizing flow of gas from said vessel into said passage.

3. An assembly according to claim 1 wherein said means for selectively closing off said passage between said orifice and said first opening is a gate valve.

* * * * *

UNITED STATES PATENT AND TRADEMARK OFFICE
CERTIFICATE OF CORRECTION

PATENT NO. : 4,115,072
DATED : September 19, 1978
INVENTOR(S) : William C. Nielsen It is certified that error appears in the above-identified patent and that said Letters Patent are hereby corrected as shown below:

Col. 1, line 29, "ecomonic" should read --economic--.

Col. 1, line 47, "generator" should read --regenerator--.

Col. 6, line 31, "around conduit" should read --around said conduit--.

Col. 6, line 40, "means releasably fixed to said outer end of said passage for selectively closing off said passage to prevent the escape of gases" should read --means releasably fixed to said outer end of said passage for closing off said passage and said orifice to prevent the escape of gases--.

Signed and Sealed this

Fourth Day of December 1979

[SEAL]

Attest:

SIDNEY A. DIAMOND

Attesting Officer

Commissioner of Patents and Trademarks